(12) United States Patent
Yasuda et al.

(10) Patent No.: US 9,158,067 B2
(45) Date of Patent: Oct. 13, 2015

(54) OPTICAL BOARD, METHOD FOR MANUFACTURING THE SAME, AND OPTICAL MODULE STRUCTURE

(71) Applicant: HITACHI CABLE, LTD., Tokyo (JP)

(72) Inventors: Hiroki Yasuda, Mito (JP); Hiroshi Ishikawa, Hitachi (JP); Kouki Hirano, Hitachinaka (JP); Hitoshi Horita, Hitachi (JP)

(73) Assignee: Hitachi Metels, Ltd., Tokyo (JP)

( * ) Notice: Subject to any disclaimer, the term of this patent is extended or adjusted under 35 U.S.C. 154(b) by 171 days.

(21) Appl. No.: 13/727,039

(22) Filed: Dec. 26, 2012

(65) Prior Publication Data

US 2013/0170790 A1 Jul. 4, 2013

(30) Foreign Application Priority Data

Dec. 28, 2011 (JP) .................................. 2011-288307
Oct. 18, 2012 (JP) .................................. 2012-230615

(51) Int. Cl.
*G02B 6/12* (2006.01)
*G02B 6/42* (2006.01)

(52) U.S. Cl.
CPC ................ *G02B 6/12* (2013.01); *G02B 6/4214* (2013.01); *G02B 6/4274* (2013.01)

(58) Field of Classification Search
CPC .......... G02B 6/12; G02B 6/26; G02B 6/4214; G02B 6/43; G02B 6/42; G02B 6/428; G02B 6/13
USPC .......................................... 385/14, 31, 65, 83
See application file for complete search history.

(56) References Cited

U.S. PATENT DOCUMENTS

| | | | |
|---|---|---|---|
| 6,406,196 B1* | 6/2002 | Uno et al. ........................ | 385/89 |
| 6,947,645 B2* | 9/2005 | Korenaga et al. ................ | 385/49 |
| 2006/0159405 A1* | 7/2006 | Yajima ............................. | 385/88 |
| 2006/0198573 A1* | 9/2006 | Iwasaki et al. .................. | 385/14 |
| 2014/0133799 A1* | 5/2014 | Yasuda et al. ................... | 385/14 |

FOREIGN PATENT DOCUMENTS

| JP | 2001-059911 | 3/2001 |
|---|---|---|
| JP | 2003167175 A | 6/2003 |

OTHER PUBLICATIONS

The Chinese Office action dated Feb. 12, 2015 and its English translation.

* cited by examiner

*Primary Examiner* — Eric Wong
*Assistant Examiner* — Mary El Shammaa
(74) *Attorney, Agent, or Firm* — Roberts Mlotkowski Safran & Cole, PC

(57) ABSTRACT

An optical board including a substrate including a plate-shaped resin including a first main plane and a second main plane facing each other, and a slit-shaped optical fiber receiving portion which penetrates between the first main plane and the second main plane in a thickness direction, a metal layer provided on the second main plane, and a wiring pattern consisting of metal and provided on the first main plane. An inclined plane is provided at an end of the optical fiber receiving portion in the substrate, a tilt angle of the inclined plane with respect to the first main plane is an obtuse angle, and a reflective layer is provided on the inclined plane for reflecting a light output from an optical fiber received in the optical fiber receiving portion toward the first main plane.

19 Claims, 7 Drawing Sheets

OPTICAL BOARD, METHOD FOR MANUFACTURING THE SAME, AND OPTICAL MODULE STRUCTURE

The present application is based on Japanese patent application No. 2011-288307 filed on Dec. 28, 2011 and Japanese patent application No. 2012-230615 filed on Oct. 18, 2012, the entire contents of which are incorporated herein by reference.

BACKGROUND OF THE INVENTION

1. Field of the Invention

The present invention relates to an optical board, a method for manufacturing an optical board, and an optical module structure, more particularly, to an optical board for receiving an optical fiber, a method for manufacturing the same, and an optical module structure with an optical board.

2. Description of the Related Art

Conventionally, an optical mounting board which has a groove for holding an optical fiber and on which a photoelectric conversion device is mounted has been known as disclosed by Japanese Laid-Open Publication No. 2003-167175 (JP-A 2003-167175).

The optical mounting board disclosed by JP-A 2003-167175 is formed by pressing a die having a triangular pole-shaped protrusion (a protrusion having a triangular cross section) on a substrate material which is softened. On the optical mounting board, a guide groove with a shape corresponding to the protrusion of the die is formed and a tapered plane is formed at an end of this guide groove. A reflecting plane is formed by plating a metal layer or pasting a mirror on the tapered plane to reflect an output light of the optical fiber held in the guide groove toward a light receiving element.

SUMMARY OF THE INVENTION

However, the optical mounting board disclosed by JP-A 2003-167175 requires an expensive manufacturing equipment, since the die is used for the formation of the guide groove and the tapered plane.

Accordingly, it is an object of the present invention to provide an optical board, a method for manufacturing an optical board, and an optical module structure, by which the manufacturing cost can be reduced.

According to a first feature of the invention, an optical board comprises:

a substrate including a plate-shaped resin including a first main plane and a second main plane facing each other, and a slit-shaped optical fiber receiving portion which penetrates between the first main plane and the second main plane in a thickness direction;

a metal layer provided on the second main plane; and a wiring pattern consisting of metal and provided on the first main plane, wherein an inclined plane is provided at an end of the optical fiber receiving portion in the substrate, a tilt angle of the inclined plane with respect to the first main plane is an obtuse angle, and a reflective layer is provided on the inclined plane for reflecting a light output from an optical fiber received in the optical fiber receiving portion toward the first main plane.

According to a second feature of the invention, a method for manufacturing an optical board comprises:

a first step of forming a first metal layer on a first main plane of a substrate comprising a plate-shaped resin as well as forming a metal layer on a second main plane;

a second step of partially removing the first metal layer to expose a strip-shaped portion; and a third step of irradiating laser beam obliquely to the exposed strip-shaped portion, to form an optical fiber receiving portion and an inclined plane at an end of the optical fiber receiving portion.

According to a third feature of the invention, an optical module structure comprises:

an optical board comprising:

a substrate including a plate-shaped resin including a first main plane and a second main plane facing each other, and a slit-shaped optical fiber receiving portion which penetrates between the first main plane and the second main plane in a thickness direction;

a metal layer provided on the second main plane; and a wiring pattern consisting of metal and provided on the first main plane; and and a photoelectric conversion device for converting an optical signal to be transmitted through an optical fiber into an electric signal or an electric signal into the optical signal, wherein an inclined plane is provided at an end of the optical fiber receiving portion in the substrate, a tilt angle of the inclined plane with respect to the first main plane is an obtuse angle, and a reflective layer is provided on the inclined plane for reflecting a light output from an optical fiber received in the optical fiber receiving portion toward the first main plane, wherein the photoelectric conversion device is mounted on the first main plane, to cover the inclined plane.

EFFECTS OF THE INVENTION

According to an optical board, a method for manufacturing an optical board, and an optical module structure of the present invention, it is possible to reduce the manufacturing cost.

BRIEF DESCRIPTION OF THE DRAWINGS

Next, embodiments of the present invention will be described in conjunction with appended drawings, wherein:

FIGS. 1A and 1B show an example of a configuration of an optical board and an optical module structure with the optical board in the first embodiment according to the present invention, wherein FIG. 1A is a plan view thereof, and FIG. 1B is a side view thereof;

DETAILED DESCRIPTION OF THE EMBODIMENTS

Next, the embodiments of the present invention will be described in more detail in conjunction with the appended drawings.

First Embodiment

Figure 1A:
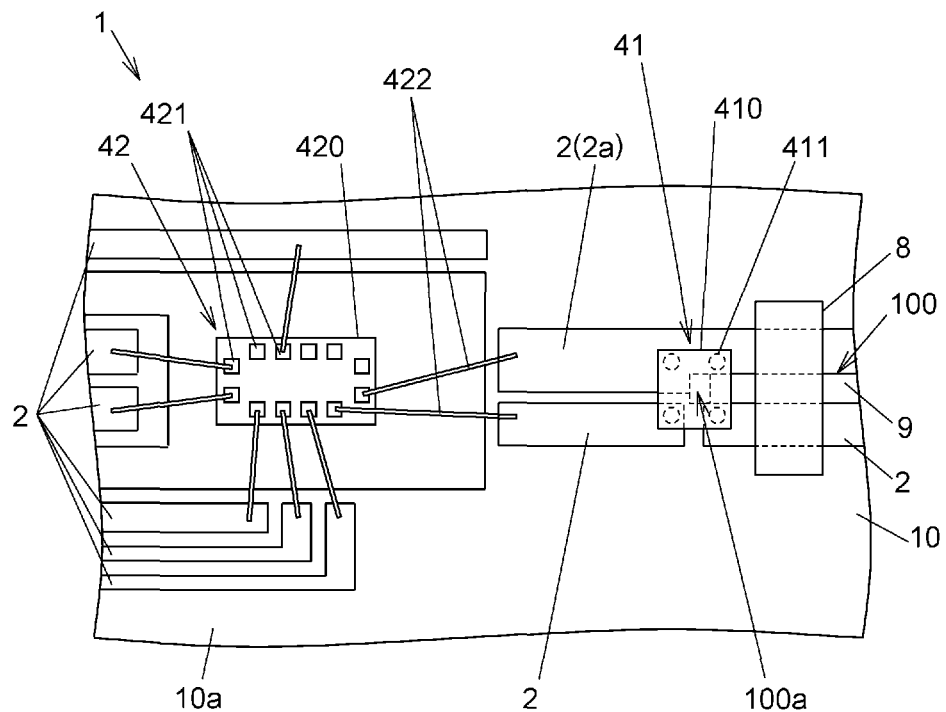
Figure 1B:
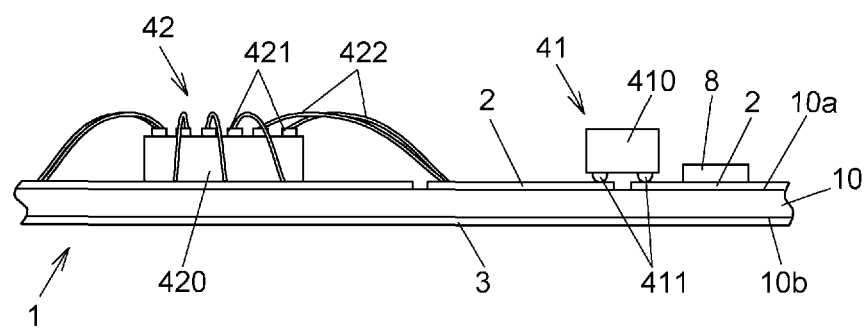

FIGS. 1A and 1B show an example of a configuration of an optical board and an optical module structure with the optical board in the first embodiment according to the present invention, wherein FIG. 1A is a plan view thereof, and FIG. 1B is a side view thereof.

An optical board 1 includes a plate-shaped substrate 10 having a first main plane 10a and a second main plane 10b that are facing each other. The substrate 10 is made of an insulating resin such as polyimide. The first main plane 10a and the second main plane 10b are parallel to each other, and the substrate 10 has a thickness of e.g. 70 μm. FIG. 1A shows a state of the optical board 1 viewed from the side of the first main plane 10a.

The optical board 1 further includes a plurality of wiring patterns 2 made of an electrically conductive metal foil formed on the first main plane 10a of a substrate 10, and an electrically conductive metal layer 3 formed on the second main plane 10b. In the present embodiment, the metal layer 3 is provided entirely over the second main plane 10b. A surface of a resin of the substrate 10 is exposed between respective wiring patterns of the plurality of wiring patterns 2. The wiring patterns 2 located on a back side with respect to a photoelectric conversion device 41 and a retainer member 8 to be explained later are illustrated by broken lines in FIG. 1

Further, the substrate 10 is provided with a slit-shaped optical fiber receiving portion 100, which penetrates in the thickness direction of the substrate 10 and between the first main plane 10a and the second main plane 10b and which extends parallel to the first main plane 10a and the second main plane 10b. At one end (terminal) portion of the optical fiber receiving portion 100, a light reflecting portion 100a for reflecting a light transmitted through an optical fiber 9 as a transmission medium is formed. The other end portion of the optical fiber receiving portion 100 is opened toward an end face (a side surface at the end portion of the substrate 10 between the first main plane 10a and the second main plane 10b) of the substrate 10. The detailed configuration of the reflecting portion 100a will be described later.

The optical fiber 9 is accommodated (received) in the optical fiber receiving portion 100. The optical fiber 9 is retained by the plate-shaped retainer member 8 attached to the first main plane 10a such that the optical fiber 9 will not move out from or slip off the optical fiber receiving portion 100.

In the optical board 1, the photoelectric conversion device 41 and a semiconductor circuit device 42 which is electrically connected to the photoelectric conversion device 41 are mounted on the wiring patterns 2 on the first main plane 10a. The photoelectric conversion device 41 is a device which converts an electrical signal into an optical signal or converts an optical signal into an electrical signal. As an example of the former one, a light emitting element such as semiconductor laser device, LED (Light Emitting Diode) may be cited. As an example of the latter one, a light receiving element such as photodiode may be cited. The photoelectric conversion device 41 is configured to output or input a light from a light emitting/receiving portion 410a formed on the side of the substrate 10 (see FIG. 4) along a direction perpendicular to the substrate 10.

When the photoelectric conversion device 41 is a device which converts an electrical signal into an optical signal, the semiconductor circuit device 42 is a driver IC for driving the photoelectric conversion device 41. Alternatively, when the photoelectric conversion device 41 is a device which converts an optical signal into an electrical signal, the semiconductor circuit device 42 is a receiver IC which amplifies a received signal to be input from the photoelectric conversion device 41.

In the present embodiment, the photoelectric conversion device 41 is flip-chip mounted on the substrate 10, and a main body 410 is provided with four terminals (bumps) 411. The four terminals 411 are connected to the wiring patterns 2, respectively. In addition, the photoelectric conversion device 41 is mounted at such a position that the main body 410 faces the reflecting portion 100a.

If the photoelectric conversion device 41 is a device which converts an electrical signal into an optical signal, the reflecting portion 100a reflects the light output from the photoelectric conversion device 41 toward the end face of the optical fiber 9. Alternatively, if the photoelectric conversion device 41 is a device which converts an optical signal into an electrical signal, the reflecting portion 100a reflects the light output from the optical fiber 9 toward the photoelectric conversion device 41.

In the semiconductor circuit device 42, a plurality of (the number is twelve in the example shown in FIG. 1) terminals (electrode pads) 421 are provided on an opposite side of a surface facing the wiring patterns 2 in the main body 420, and each terminal 421 is electrically connected to the wiring pattern 2 by a bonding wire 422. Some of the terminals 421 are connected to the wiring patterns 2 to which terminals 411 of the photoelectric conversion device 41 are connected, so that the semiconductor circuit device 42 and the photoelectric conversion device 41 are electrically connected to each other.

Although not shown in FIG. 1, connectors, IC (Integrated Circuit), and electronic parts such as active element (such as transistors) and passive element (such as resistor, capacitor) may be mounted on the optical board 1 in addition to the photoelectric conversion device 41 and the semiconductor circuit device 42.

Next, a method of manufacturing the optical board 1 will be explained below with reference to FIGS. 2A to 2E and FIGS. 3A to 3D.

FIGS. 2A to 2E are cross-sectional views showing a process for forming a reflecting portion 100a and a peripheral portion thereof in the optical board 1. FIGS. 3A to 3D are plan views showing the process for forming the reflecting portion 100a and the peripheral portion thereof the optical board 1 as viewed from a side of a first main plane 10a.

The manufacturing process of the optical board 1 has at least a first step of forming a first metal layer 21 on a first main plane 10a of a substrate 10 as well as forming a metal layer 31 on a second main plane 10b of the substrate 10, a second step of partially removing the first metal layer 21 to expose a strip-shaped portion 21a, a third step of irradiating laser beam L obliquely to the exposed strip-shaped portion 21a of the first main plane 10a, to form the optical fiber receiving portion 100 and an inclined plane 101 at an end of the optical fiber receiving portion 100, a fourth step of forming a second metal layer 22 on the inclined plane 101 and the first metal layer 21 of the first main plane 10a, and a fifth step of partially etching the first metal layer 21 and the second metal layer 22 to form a plurality of wiring patterns 2 on the first main plane 10a.

In the present embodiment, the manufacturing process further has a sixth step of plating gold (Au) and nickel (Ni) on the first and second metal layers 21, 22 and the metal layer 31 on the side of the second main plane 10b. Next, the first to sixth steps will be described in more detail.

Figure 2A:
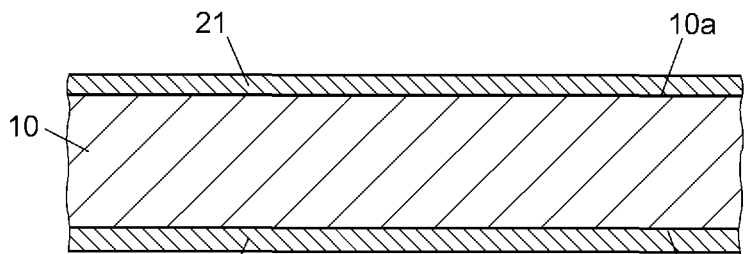
FIGS. 2A to 2E are cross-sectional views showing a process for forming a reflecting portion and a peripheral portion thereof in the optical board.
Figure 2B:
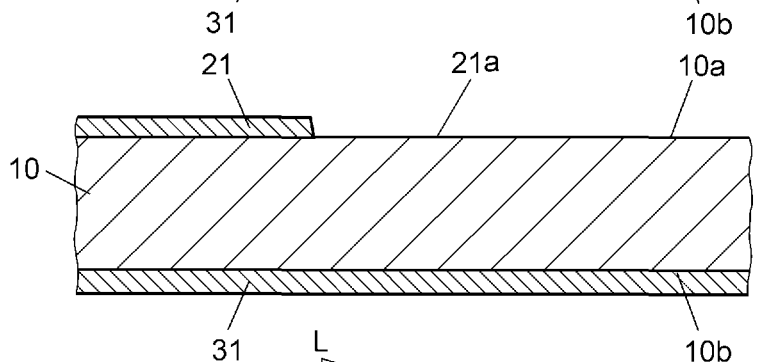
Figure 3A:
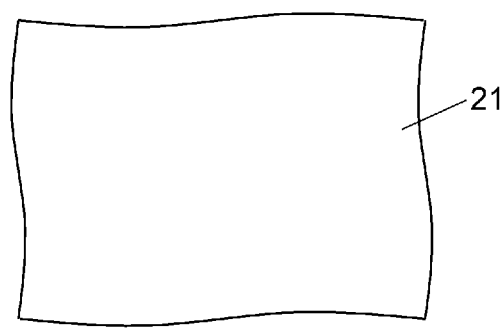
FIGS. 3A to 3D are plan views showing the process for forming the reflecting portion and the peripheral portion thereof the optical board as viewed from a side of a first main plane.
Figure 3B:
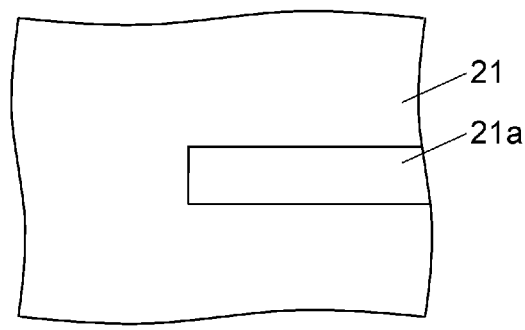

In the first step, as shown in FIGS. 2A and 3A, the first metal layer 21 is formed entirely on the first main plane 10a of the substrate 10 and the metal layer 31 is formed entirely on the second main plane 10b, respectively, by e.g. adhesion, vapor deposition, or electrolytic plating. In the present embodiment, the first metal layer 21 and the metal layer 31 are essentially consisting of copper (Cu) which is a good conductor. In the present embodiment, the metal layer 31 is formed thicker than the first metal layer 21, but the present invention is not limited thereto. The metal layer 31 and the first metal layer 21 may have the same thickness.

In the second step, as shown in FIGS. 2A and 3A, the first metal layer 21 is partially removed in the strip shape by etching to expose a strip-shaped portion 21a. More concretely, a resist film is formed on the first metal layer 21 except for the exposed strip-shaped portion 21a in which the first metal layer 21 is removed, and a portion of the first metal layer 21 with no resist film is dissolved by etching.

Figure 2C:
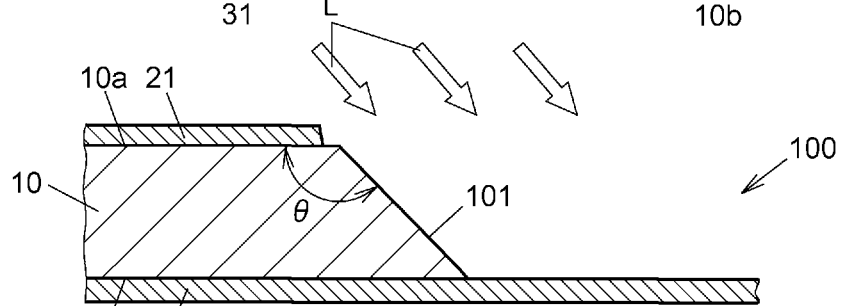
Figure 3C:
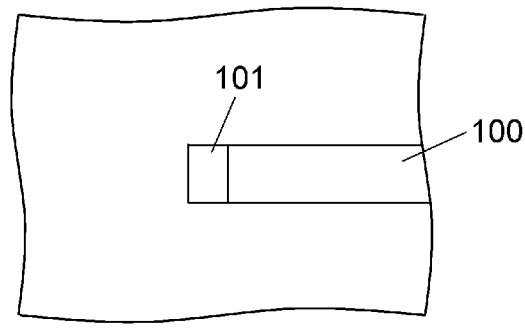

In the third step, as shown in FIG. 2C, the laser beam L is irradiated obliquely to the first main plane 10a including the exposed strip-shaped portion 21a from which the first metal layer 21 is removed. As this laser beam, more specifically, e.g. excimer laser, UV (ultraviolet) laser can be used. By irradiation of the laser beam, the optical fiber receiving portion 100 and the inclined plane 101 are formed at the end of the optical fiber receiving portion 100 are formed on the substrate 10 as shown in FIGS. 2C and 3C. Intensity of the laser beam L is determined to the extent such that the substrate 10 can be etched by irradiation but the first metal layer 21 and the metal layer 31 cannot be etched by irradiation. Therefore, the optical fiber receiving portion 100 is formed only the part from which the first metal layer 21 is removed.

The inclined plane 101 is formed along the traveling direction of the laser beam L. In other words, when an angle of the inclined plane 101 to the first main plane 10a is a tilt angle θ, the inclined plane 101 having a desired shape can be formed by irradiating the laser beam L to the first main plane 10a at an angle corresponding to the tilt angle θ. The tilt angle θ is an obtuse angle (θ>90°), and the tilt angle θ is 135° in the present embodiment. That is, the angle made by the second main plane 10b and the inclined plane 101 is 45°.

The metal layer 31 on the second main plane 10b is not removed by irradiation of the laser beam L, and serves as a bottom of the optical fiber receiving portion 100. This metal layer 31 supports the optical fiber 9 from the side of the second main plane 10b (as shown in FIG. 1).

Figure 2D:
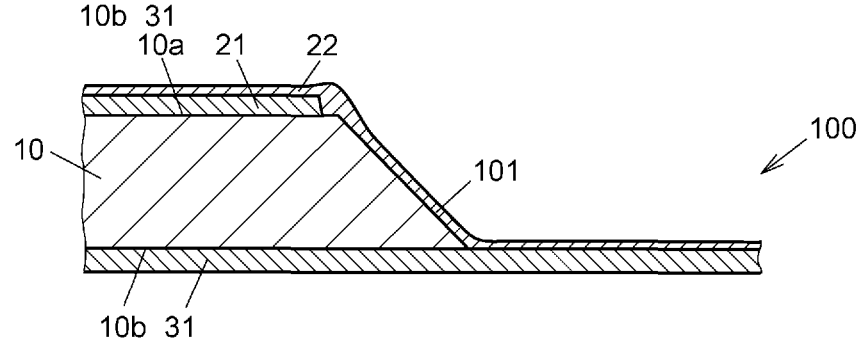

In the fourth step, as shown in FIG. 2D, the second metal layer 22 is formed entirely on the inclined plane 101 formed on the substrate 10 and on the first metal layer 21 formed on the first main plane 10a in the third step. In the present embodiment, the second metal layer 22 is essentially consisting of copper (Cu), and formed on the first metal layer 21 and the inclined plane 101 by e.g. electroless plating. In addition, the second metal layer 22 is also formed on one surface (a surface on the side of the second main plane 10b) of the metal layer 31 in the optical fiber receiving portion 100.

Figure 3D:
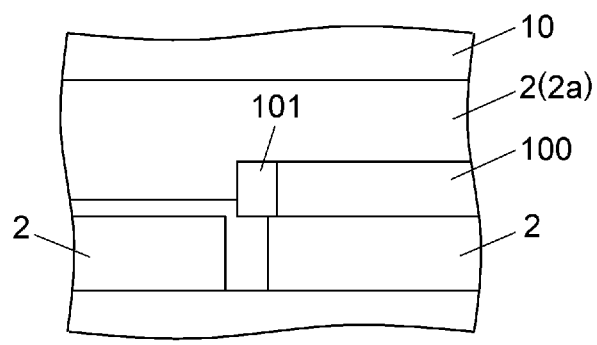

In the fifth step, as shown in FIG. 3D, by partially etching the first and second metal layers 21, 22 to form the plurality of wiring patterns 2 on the first main plane 10a. More specifically, a resist film is formed on the second metal layer 22 except for the regions from which the first metal layer 21 and the second metal layer 22 are removed, and the first metal layer 21 and the second metal layer 22 at the regions with no resist film is dissolved by etching from to dissolve. This resist film remains also formed on the second metal layer 22 which is formed on the inclined plane 101 and the second metal layer 22 on the inclined plane 101 remain without being removed.

Figure 2E:
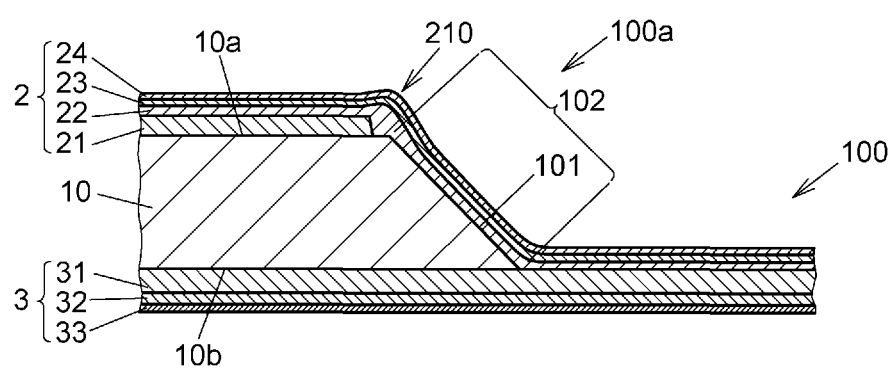

In the sixth step, as shown in FIG. 2E, nickel (Ni) plating is applied on the second metal layer 22 and the metal layer 31 on the second main plane 10b that remain without being removed by etching in the fifth step, to form nickel plating layers 23, 32. Thereafter, gold (Au) plating is further applied on the Ni layers 23 and 32 to form Au plating layers 24, 33. The Ni plating nickel and Au plating can be performed by e.g. electroless plating.

After performing the first to sixth steps as described above, the wiring pattern 2 consisting of a four-layer structured metal layer including the first metal layer 21, the second metal layer 22, the Ni plating layer 23, and the Au plating layer 24 is formed on the first main plane 10a of the substrate 10. A total thickness of the first metal layer 21 and the second metal layer 22 is e.g. 5 to 25 μm, a thickness of the Ni plating layer 23 is e.g. 15 μm or less, and a thickness of the Au plating layer 24 is e.g. 0.03 to 0.5 μm.

Further, the reflective layer 102 consisting of a three-layer structured metal layer including the second metal layer 22, the Ni plating layer 23, and the Au plating layer 24 is formed on the inclined plane 101. In other words, the reflecting portion 100a is configured by forming the reflective layer 102 on the inclined plane 101.

The reflective layer 102 is the metal layer which is formed by the steps of forming the wiring pattern 2 (the fourth to sixth steps). The wiring pattern 2 and the reflective layer 102 have a common layer structure except that the first metal layer 21 is formed as a lowermost layer in the wiring pattern 2. Further, both of the wiring pattern 2 and the reflective layer 102 are plated with gold at their uppermost surfaces (the Au plating layer 24).

On the other hand, the metal layer 3 consisting of a three-layer structured metal layer including the metal layer 31, the Ni plating layer 32, and the Au plating layer 33 is formed on the second main plane 10b of the substrate 10. Since the second metal layers 22 provided on the wiring pattern 2 and the reflective layer 102 are formed on the metal layer 31 of the metal layer 3 in the optical fiber receiving portion 100, the wiring pattern 2 and the metal layer 3 that are formed continuously with the reflective layer 102 are electrically connected to each other.

In the present embodiment, the wiring pattern 2 formed continuously with the reflective layer 102 is a ground pattern 2a which provides a ground potential (see FIG. 1), so that the potential of the metal layer 3 is the ground potential. According to this structure, the operation of the electronic components that are mounted on the first main plane 10a of the substrate 10 becomes stable. Further, a ground (GND) terminal of an IC (not shown) which is mounted on the first main plane 10a is easily connected to the ground potential (i.e. grounded) by forming a through-hole in the substrate 10.

Figure 4:
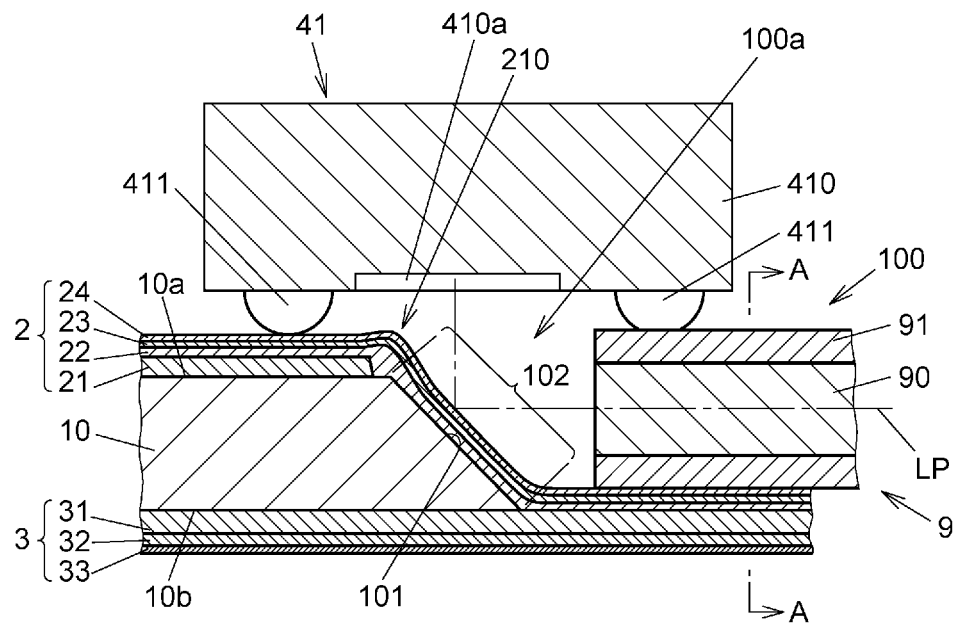
FIG. 4 is a cross-sectional view showing an example of the optical module structure in the first embodiment according to the present invention.

FIG. 4 is a cross-sectional view showing an example of the optical module structure in the first embodiment according to the present invention. The optical module structure comprises an optical board 1 and a photoelectric conversion device 41. The photoelectric conversion device 41 is mounted on the first main plane 10a, to cover the inclined plane 101 from the side of the first main plane 10a.

One end of the optical fiber 9 is accommodated (received) in the optical fiber receiving portion 100 and an end face 9a thereof is facing the reflective layer 102. The optical fiber 9 has a tubular cladding layer 91 on an outer periphery of the core 90. In FIG. 4, a light path (optical path) LP of a light propagating through the optical fiber 9 as a transmission medium is indicated by a dashed line.

When the light is output from the optical fiber 9 (core 90), the reflective layer 102 reflects an output light toward the first main plane 10a. In the case that the photoelectric conversion device 41 is a light receiving element, the light reflected by the reflective layer 102 is input to the photoelectric conversion device 41 through a light emitting/receiving portion 410a provided on a main body 410 of the photoelectric conversion device 41, and the photoelectric conversion device 41 converts an optical signal of this input light into an electrical signal.

In the case that the photoelectric conversion device 41 is a light emitting element, the photoelectric conversion device 41 converts an electric signal supplied from the semiconductor circuit device 41 into an optical signal, and the light representing this optical signal is output from the light emitting/receiving portion 410a. The output light is reflected at the reflective layer 102 and input to the core 90 of the optical fiber 9 through which the output light propagates.

Functions and Effects of the First Embodiment

According to the present embodiment, the following effects and advantages can be obtained.

(1) The optical fiber receiving portion 100 is formed to penetrate through the substrate 10 in the thickness direction of the substrate 10, so that the optical fiber receiving portion 100 and the inclined plane 101 can be formed by irradiating the laser beam. Thus, the optical fiber receiving portion 100 and the inclined plane 101 can be formed at the substrate 10 without using e.g. a mold.

(2) The optical fiber receiving portion 100 is formed to penetrate through the substrate 10 in the thickness direction of the substrate 10, so that the optical board 1 can be formed thinner than e.g. an optical board comprising a groove-like receiving part for receiving an optical fiber. In other words, the thickness of the optical board 1 can be substantially equal to a diameter of the optical fiber 9 (e.g. the thickness of the optical board 1 is within 20%±of the diameter of the optical fiber 9).

(3) The reflective layer 102 is electrically conductive and formed continuously with the wiring pattern 2, so that the wiring pattern 2 and the metal layer 3 can be connected electrically to each other without providing the substrate 10 with e.g. a through-hole.

(4) The inclined plane 101 of the substrate 10 is formed by the irradiation of the laser beam, so that it is possible to form its surface as a flat surface with high accuracy. This allows the light output from the photoelectric conversion device 41 to reflect toward the optical fiber 9 accurately, or the light output from the optical fiber 9 to reflect toward the photoelectric conversion device 41 accurately.

(5) Each of the wiring pattern 2 and the reflective layer 102 is plated with Au plating at the uppermost layer thereof, so that it is possible to suppress a decrease in reflectance of the reflective layer 102 due to corrosion, and to provide an excellent electrical connection between the wiring pattern 2 and the photoelectric conversion device 41.

(6) Each layer in the reflective layer 102 is formed on the inclined plane 101 of the substrate 10 during the process for forming the wiring pattern 2. That is, since there is no need for a special step for forming the reflective layer 102, the manufacturing time of the optical board 1 and the manufacturing cost can be reduced.

(Modification)

For example, the optical board 1 according to the first embodiment can be modified as follows.

Figure 5:
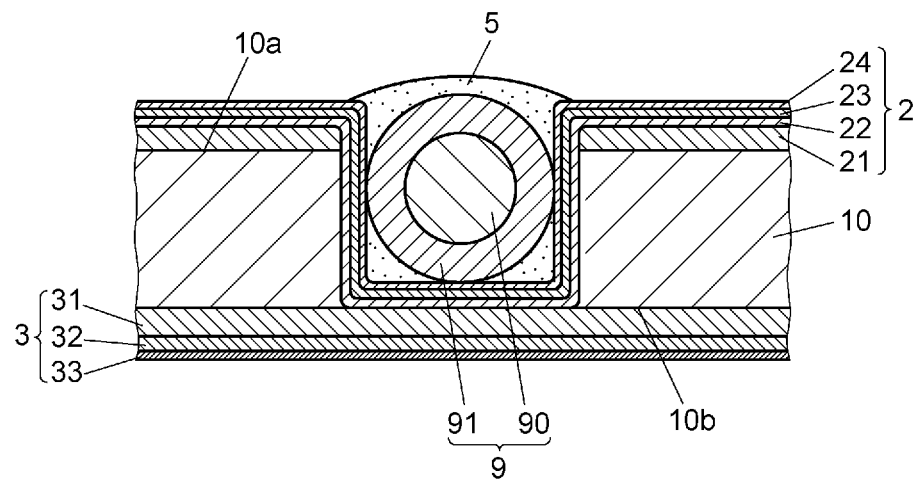
FIG. 5 is a cross-sectional view taken along line A-A of FIG. 4 showing an example of an optical module structure in a modification of the first embodiment.
Figure 6A:
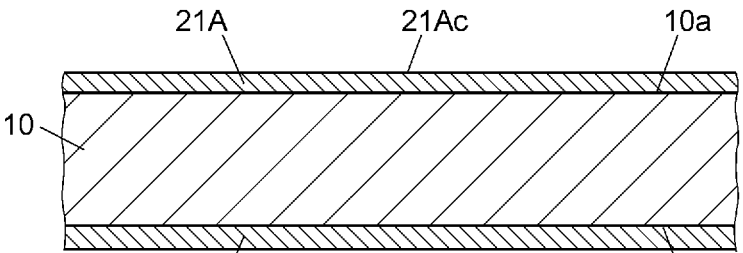
FIGS. 6A to 6E are cross-sectional views showing the process for forming a reflecting portion and a peripheral portion thereof an optical board in the second embodiment as viewed from a side of a first main plane.
Figure 6B:
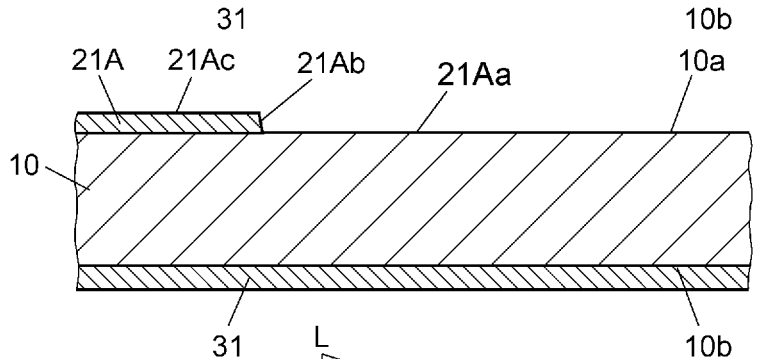
Figure 6C:
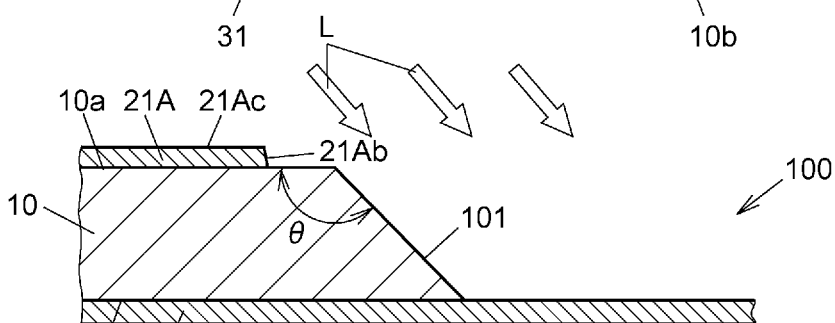
Figure 6D:
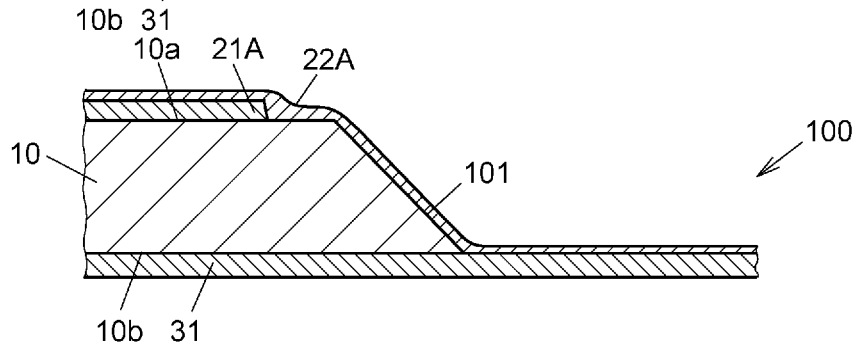
Figure 6E:
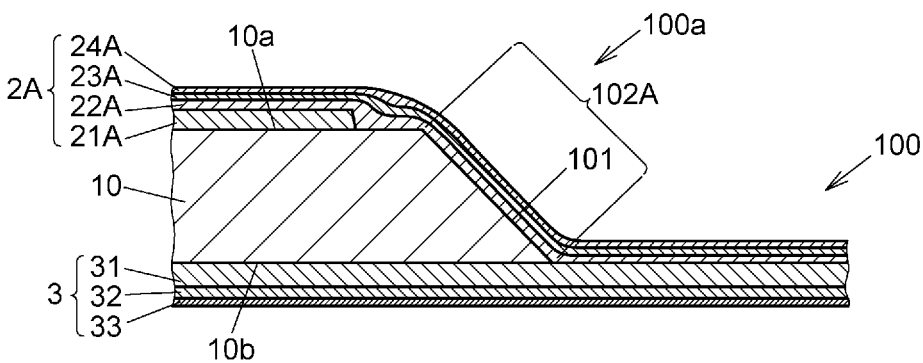

FIG. 5 is a cross-sectional view taken along line A-A of FIG. 4 showing an example of an optical module structure in a modification of the first embodiment. FIG. 5 shows the state that the optical fiber 9 is fixed in the optical fiber receiving portion 100.

The optical module structure in the present modification has a common structure to the optical module according to the first embodiment, except the means for fixing the optical fiber 9. Therefore, same reference numerals are assigned to the parts having the same function and the description thereof is omitted.

In this modification, the optical fiber 9 is fixed in the optical fiber receiving portion 100 by solder 5 without using the retainer member 8. More specifically, the solder 5 is adhered to the uppermost surface of the metal layer formed at portions sandwiching the optical fiber receiving portion 100 in the first main plane 10a of the substrate 10 and at an inner surface of the optical fiber receiving portion 100 (specifically, the Au plating layer 24), so that the optical fiber 9 is fixed in the optical fiber receiving portion 100. It is sufficient that the solder 5 is adhered at least to the Au plating layer 24 formed at the portions sandwiching the optical fiber receiving portion 100 in the first main plane 10a of the substrate 10 and that an opening of the optical fiber receiving portion 100, which is opened toward the first main plane 10a is sealed.

For this modification, it is not necessary to provide a separate retainer member 8, and it is possible to fix the optical fiber 9 in the step of fabricating the optical board 1.

Second Embodiment

Next, a second embodiment of the present invention will be described with reference to FIGS. 6 to 8. The method for fabricating the optical board 1 in the second embodiment is different in the second and third steps from those in the method for fabricating the optical board 1 in the first embodiment. In FIGS. 6 to 8, the same reference numerals are assigned to the parts having the same function as to the description of the optical board 1 and the description thereof is omitted.

In the present embodiment, a first metal layer 21A is formed instead of the first metal layer 21 in the first embodiment, a second metal layer 22A is formed instead of the second metal layer 22, Ni plating layer 23A is formed instead of the Ni plating layer 23, and Au plating layer 24A is formed instead of the Au plating layer 24. Materials of respective metal layers and respective plating layers are common to those in the first and the second embodiments. The first metal layer 21A, the second metal layer 22A, the Ni plating layer 23A, and the Au plating layer 24A constitute a wiring pattern 2A in the present embodiment. The second metal layer 22A covers the first metal layer 21A, and the second metal layer 22A is partially formed on the first main plane 10a. In addition, the second metal layer 22A is formed continuously from a region on the inclined plane 101 toward a region on the first metal layer 21A, to form the reflective plane 102. The Ni plating layer 23A and the Au plating layer 24A are formed on the second metal layer 22A.

FIGS. 6A to 6E are cross-sectional views showing the process for forming a reflecting portion 100a and a peripheral portion thereof the optical board 1 in the second embodiment.

Figure 7A:
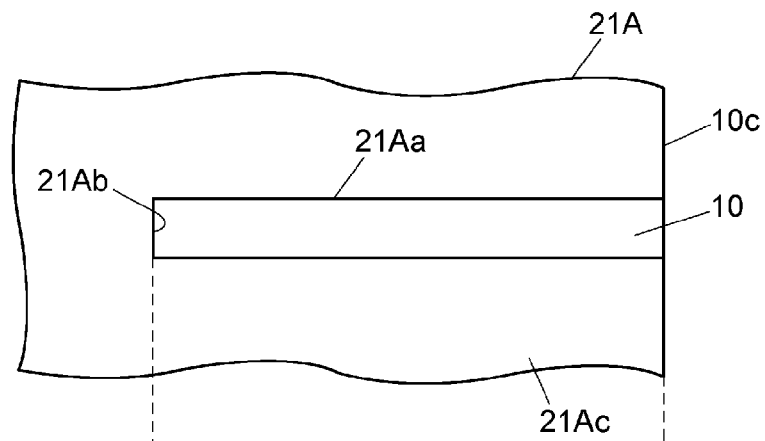
FIGS. 7A and 7B are plan views showing the process for forming the reflecting portion and the peripheral portion thereof the optical board in the second embodiment as viewed from the side of the first main plane.
Figure 7B:
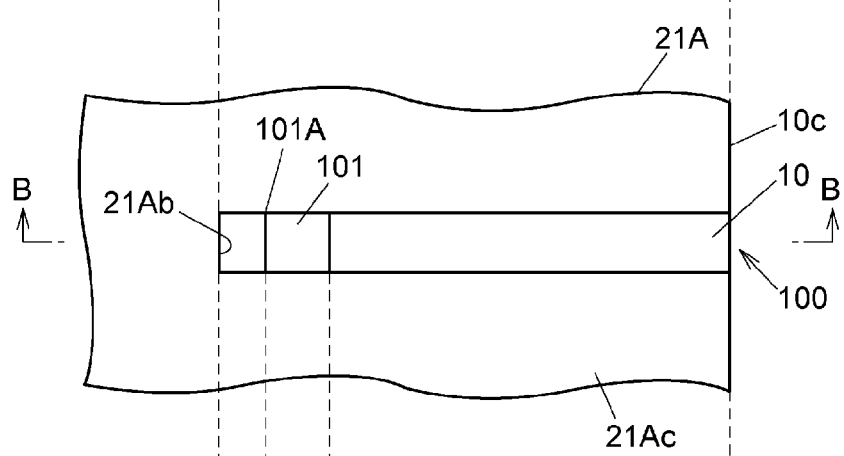
Figure 7C:
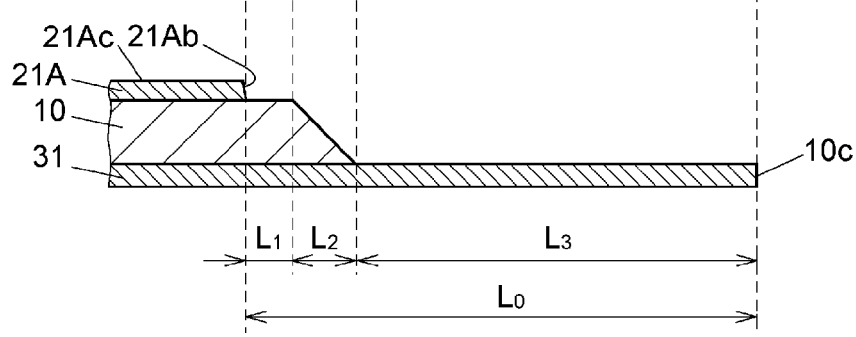
FIG. 7C is a cross-sectional view taken along line B-B of FIG. 7B.
Figure 8:
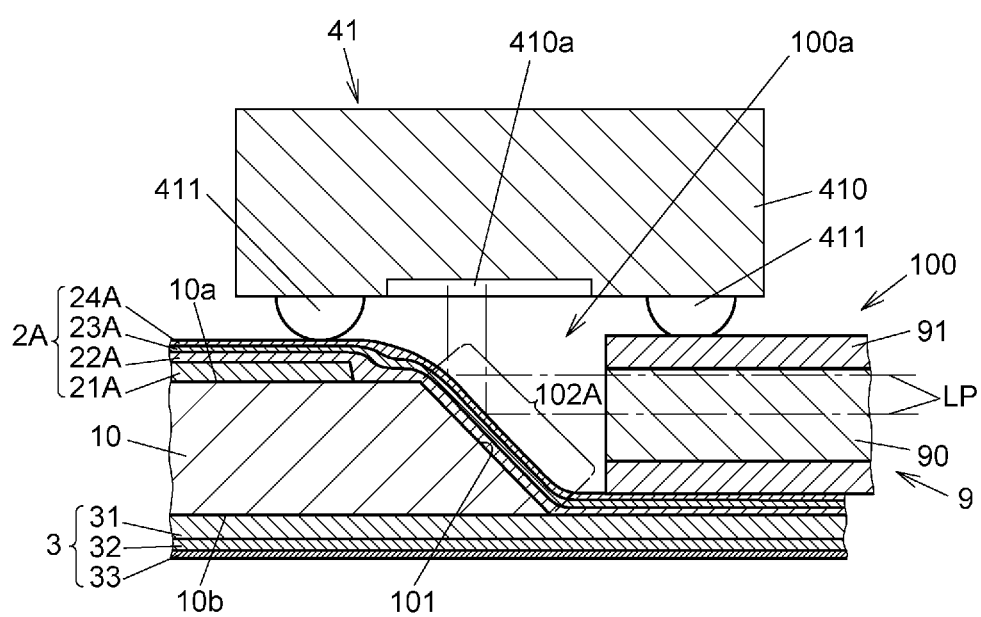
FIG. 8 is a cross-sectional view showing an example of an optical module structure in the second embodiment.

FIGS. 7A and 7B are plan views showing the process for forming the reflecting portion 100a and the peripheral portion thereof viewed from the side of the first main plane 10a of the optical board 1 in the second embodiment, and FIG. 7C is a cross-sectional view taken along line B-B of FIG. 7B.

In the second step in the present embodiment, a length $L_0$ (in a longitudinal direction) of a strip-shaped exposed portion 21Aa, which is exposed by partially removing the first metal layer 21A by etching, is longer than a length in a longitudinal direction of the strip-shaped portion 21a in the first embodiment. More specifically, an area of the resist film formed on the first metal layer 21A is formed to be smaller than an area of the resist film in the first embodiment, to dissolve the first metal layer 21A over a wider area than that in the first embodiment.

In the third step, similarly to the first embodiment, the inclined plane 101 is formed by irradiating the laser beam L obliquely to the first main plane 10a. At this time, a region to be irradiated by the laser beam L in the first main plane 10a is shifted toward an end face 10c of the substrate 10 from a position distant for a predetermined length $L_1$ along the longitudinal direction of the strip-shaped exposed portion 21Aa from an end face 21Ab of the first metal layer 21A, which is facing the strip-shaped exposed portion 21Aa. In other words, an end portion 101A of the inclined plane 101 facing to the first main plane 10a is located at a region which is distant for the predetermined length $L_1$ along the longitudinal direction of the optical fiber receiving portion 100 from the end face 21Ab of the first metal layer 21A at the first main plane 10a. Thus, the light with the intensity which can etch the substrate 10 will not be irradiated to a region, a distance of which from the end face 21Ab is less than the predetermined distance $L_1$.

The predetermined distance $L_1$ is set to be such a dimension that a level difference between the surface 21Ac of the first metal layer 21A and the first main plane 10a of the substrate 10 at the end face 21Ab does not affect the flatness of the surface 22Aa of the second metal layer 22A which is formed at the inclined plane 101. In other words, the predetermined distance $L_1$ has such a dimension that any protrusion 210 (see FIG. 4) is not formed at the reflective layer 102. The protrusion 210 is a bulged portion of the reflective layer 102 formed near the end portion 101A facing the first main plane 10a of the inclined plane 101 and is generated by raising of the second metal layer 22 which is formed continuously from the portion on the first metal layer 21 to the portion on the inclined plane 101 due to the level difference between the surface of the first metal layer 21 and the first main plane 10a in the vicinity of the end portion of the inclined plane 101. This predetermined distance $L_1$ is, for example, longer than a thickness of the wiring pattern 2A in a stacking direction.

The length $L_0$ of the strip-shaped exposed portion 21Aa in the longitudinal direction is a total of the predetermined distance L1, the length $L_2$ of the inclined plane 101 along the longitudinal direction of the strip-shaped exposed portion 21Aa, and a length $L_3$ of the optical fiber receiving portion 100 in the longitudinal direction ($L_0=L_1+L_2+L_3$).

FIG. 8 is a cross-sectional view showing an example of an optical module structure in the second embodiment.

In the present embodiment, since the end face 21Ab of the first metal layer 21A is spaced from the end portion 101A of the inclined plane 101 for the predetermined distance $L_1$, the reflective layer 102A constituted from the second metal layer 22A, the Ni plating layer 23A and the Au plating layer 24A is formed to be flat entirely over the reflecting portion 100a. Therefore, as shown in FIG. 8, the light output from the core 90 of the optical fiber 9 or the light output from the light emitting/receiving portion 410a is reflected accurately even at a portion close to the first main plane 10a in the reflecting portion 100a, and is input to the photoelectric conversion device 41 or the core 90 of the optical fiber 9

Functions and Effects of the Second Embodiment

In the second embodiment described above, following functions and effects can be achieved in addition to the functions and effects (1) to (6) of the first embodiment.

In the third step, the inclined plane 101 is formed by irradiating the laser beam L to the region which is shifted toward the end face 10c of the substrate 10 from the position distant for the predetermined length $L_1$ along the longitudinal direction of the strip-shaped exposed portion 21Aa from the end face 21Ab of the first metal layer 21A, which is facing the strip-shaped exposed portion 21Aa. In other words, an end portion of the inclined plane 101, which is facing to the first main plane 10a is located at a region which is distant for the predetermined length $L_1$ along the longitudinal direction of the optical fiber receiving portion 100 from the end face 21Ab of the first metal layer 21A at the first main plane 10a. Therefore, the protrusion 210, which may be formed in the case that the end face 21Ab is close to the inclined plane 101, is not formed on the reflective layer 102A. In other words, by locating the end face 21Ab distantly from the region to be irradiated with the laser beam L, it is possible to prevent the level difference between the surface 21Ac of the first metal layer 21A and the first main plane 10a of the substrate 10 from affecting on the shape of the second metal layer 22A on the inclined plane 101. Thus, it is possible to reflect the light accurately at the entire surface of the reflecting portion 100a. Therefore, it is possible to input more light output from the core 90 of the optical fiber 9 or the light emitting/receiving portion 410a to the photoelectric conversion device 41 or the core 90 of the optical fiber 9 certainly.

Summary of the Embodiments

Next, the technical concept that is understood from the above-described embodiments will be described with referring to the reference numerals in the embodiments. However, the respective reference numerals in the following description will not limit elements in claims of the present invention to the concrete parts shown in the embodiments.

(i) An optical board (1) comprising a substrate (19) including a plate-shaped resin including a first main plane (10a) and a second main plane (10b) facing each other, and a slit-shaped optical fiber receiving portion (100) which penetrates between the first main plane (10a) and the second main plane (10b) in a thickness direction, a metal layer (31) provided on the second main plane (10b), and a wiring pattern (2,2 A) consisting of metal and provided on the first main plane (10a), in which an inclined plane (101) is provided at an end of the optical fiber receiving portion (100) in the substrate (10), a tilt angle (θ) of the inclined plane (101) with respect to the first main plane (10a) is an obtuse angle, and a reflective layer (102, 102A) is provided on the inclined plane (101) for reflecting a light output from an optical fiber (9) received in the optical fiber receiving portion (100) toward the first main plane (10a).

(ii) The optical board according to (i), in which the wiring pattern (2, 2A) and the metal layer (31) provided on the second main plane (10b) are electrically connected to each other by the reflective layer (102, 102A) on the inclined plane (101).

(iii) The optical board (1) according to (i) or (ii), in which the optical fiber receiving portion (100) and the inclined plane (101) are formed by irradiating the laser beam (L) to the first main plane (10a) at an angle corresponding to the tilt angle (θ).

(iv) The optical board (1) according to any one of (i) to (iii), in which the reflective layer (102, 102A) and the wiring pattern (2, 2A) are plated with gold (Au) plating at their outermost surface.

(v) The optical board (1) according to any one of (i) to (iv), in which the wiring pattern (2A) includes a first metal layer (21A) and a second metal layer (22A) covering the first metal layer (21A), and the inclined plane (101) includes an end portion (101A) facing an end portion of the first the main plane (10a), which is located at a position distant from an end face (21Ab) of the first metal layer (21A) of the first main plane (10a) for a predetermined distance ($L_1$) along a longitudinal direction of the optical fiber receiving portion (100).

(vi) The optical board (1) according to (v), in which the second metal layer (22A) is provided continuously from a position above the first metal layer (21A) to the inclined plane (101) to form the reflective layer (102).

(vii) The optical board (1) according to (v) or (vi), in which the predetermined distance ($L_1$) is set to be such a dimension that a level difference between a surface (21Ac) of the first metal layer (21A) and the first main plane (10a) of the substrate (10) at an end face (21Ab) does not affect a flatness of a surface (22Aa) of the second metal layer (22A) which corresponds to the inclined plane (101).

(viii) The optical board (1) according to (v), in which the optical fiber (9) is fixed in the optical fiber receiving portion (100) by a solder (5).

(ix) A method for manufacturing an optical board (1) comprising a first step of forming a first metal layer (21, 21A) on a first main plane (10a) of a substrate (10) comprising a plate-shaped resin as well as forming a metal layer (31) on a second main plane (10b), a second step of partially removing the first metal layer (21, 21A) to expose a strip-shaped portion (21Aa), and a third step of irradiating laser beam (L) obliquely to the exposed strip-shaped portion (21Aa), to form an optical fiber receiving portion (100) and an inclined plane (101) at an end of the optical fiber receiving portion (100).

(x) The method for manufacturing an optical board (1) according to (ix), further comprising a fourth step of forming a second metal layer (22, 22A) on the inclined plane (101) and the first metal layer (21, 21A) of the first main plane (10a), and a fifth step of partially etching the first metal layer (21, 21A) and the second metal layer (22, 22A) to form a wiring pattern (2, 2A) on the first main plane (10a).

(xi) The method for manufacturing an optical board (1) according to (ix) or (x), in which a region to be irradiated by the laser beam (L) in the third step is distant from an end face (21Ab) of the first metal layer (21A) facing the strip-shaped exposed portion (21Aa) for a predetermined distance ($L_1$) along a longitudinal direction of the strip-shaped exposed portion (21Aa).

(xii) The method for manufacturing an optical board (1) according to (xi), in which the predetermined distance ($L_1$) is set to be such a dimension that a level difference between a surface (21Ac) of the first metal layer (21A) and the first main plane (10a) of the substrate (10) at an end face (21Ab) does not affect a flatness of a surface (22Aa) of the second metal layer (22A) which corresponds to the inclined plane (101).

(xiii) The method for manufacturing an optical board (1) according to any one of (ix) to (xii), in which the third step comprises irradiating a laser beam (L) obliquely to the first main plane (10a) at an angle corresponding to a tilt angle (θ) of the inclined plane (101) to the first main plane (10a).

(xiv) The method for manufacturing an optical board (1) according to any one of (ix) to (xii), in which the third step comprises irradiating a laser beam (L) perpendicularly to the first main plane (10a) with the use of a shadow mask with a controlled laser beam transmittance.

(xv) The method for manufacturing an optical board (1) according to any one of (ix) to (xii), in which the inclined plane (101) is formed by machining.

(xvi) An optical module structure, comprising the optical board according to any one of (i) to (viii) and a photoelectric conversion device (41) for converting an optical signal to be transmitted through an optical fiber (100) into an electric signal or an electric signal into the optical signal, in which the photoelectric conversion device (41) is mounted on the first main plane (10a), to cover the inclined plane (101).

Although the embodiments of the present invention have been described, the embodiments described above are not intended to limit the invention according to the claims. In addition, it should be noted that all the combinations of the features described in the embodiment of the present invention are not necessarily essential for the means for solving the problems.

Further, the present invention can be embodied with appropriate modification without departing from the scope thereof. For example, the description in the above embodiments has been given for the case that the metal layer 3 is a so-called solid pattern provided on an entire surface of the second main plane 10b. However, the metal layer 3 may be partially etched to provide a wiring pattern in a desired shape. In this case, electronic components may be also mounted on the second main plane 10b.

Further, in the embodiments described above, the case of forming a single optical fiber receiving portion 100 and a single optical module structure in the optical board 1 has been described. The present invention is however not limited thereto. A plurality of optical fiber receiving portions 100 and a plurality of optical boards 1 may be formed in the optical board 1.

Further, in the embodiments described above, the case where the first metal layers 21, 21A, the second metal layers 22, 22A, and the metal layer 31 are made of copper (Cu) has been described. The present invention is however not limited thereto. All or part of the first metal layers 21, 21A, the second metal layers 22, 22A and the metal layer 31 may be made of e.g. aluminum (Al). The materials of each layer of the wiring pattern 2, 2A and the metal layer 3 are not limited to the materials described above. Also, the material of the substrate 10 is not limited to polyimide. For example, PET (Polyethylene terephthalate) may be used as the material of the substrate 10.

Still further, in the embodiments described above, the inclined plane 101 is formed by irradiating the laser beam L obliquely to the first main plane 10a. The preset invention is not limited thereto. The inclined plane 101 may be formed by irradiating the laser beam L perpendicularly to the first main plane 10a with the use of a shadow mask with a controlled laser beam transmittance which is adjusted in response to a depth (perpendicular distance) from the first main plane 10a. In the case of using the shadow mask, it is not necessary to irradiate the laser beam obliquely to first main plane 10a, so that the formation of the inclined plane 101 becomes easier.

Further, in the embodiments described above, the inclined plane 101 is formed by irradiating the laser beam L obliquely to the first main plane 10a. The present invention is not limited thereto. The inclined plane 101 may be formed by machining such as dicing. In the case of using the machining, the inclined plane 101 may be formed at a lower cost than the processing by the laser beam.

What is claimed is:

1. An optical board comprising:
   a substrate including a plate-shaped resin including a first main plane and a second main plane facing each other, and a slit-shaped optical fiber receiving portion which penetrates completely between the first main plane and the second main plane in a thickness direction;
   a metal layer provided on the second main plane; and a wiring pattern consisting of metal and provided on the first main plane, wherein an inclined plane is provided at an end of the optical fiber receiving portion in the substrate, a tilt angle of the inclined plane with respect to the first main plane is an obtuse angle, and
   a reflective layer is provided on the inclined plane for reflecting a light output from an optical fiber received in the optical fiber receiving portion toward the first main plane,
   wherein an optical fiber is sandwiched between two planes penetrating completely through the substrate.

2. The optical board according to claim 1, wherein the wiring pattern and the metal layer provided on the second main plane are electrically connected to each other by the reflective layer on the inclined plane.

3. The optical board according to claim 1, wherein the optical fiber receiving portion and the inclined plane are formed by irradiating the laser beam to the first main plane at an angle corresponding to the tilt angle.

4. The optical board according to claim 1, wherein the reflective layer and the wiring pattern are plated with gold (Au) plating at their outermost surface.

5. The optical board according to claim 1, wherein the wiring pattern includes a first metal layer and a second metal layer covering the first metal layer, and the inclined plane includes an end portion facing the first main plane end portion, which is located at a position distant from an end face of the first metal layer of the first main plane for a predetermined distance along a longitudinal direction of the optical fiber receiving portion.

6. The optical board according to claim 5, wherein the second metal layer is provided continuously from a position above the first metal layer to the inclined plane to form the reflective layer.

7. The optical board according to claim 5, wherein the predetermined distance is set to be such a dimension that a level difference between a surface of the first metal layer and the first main plane of the substrate at an end face does not affect a flatness of a surface of the second metal layer which corresponds to the inclined plane.

8. The optical board according to claim 5, wherein the optical fiber is fixed in the optical fiber receiving portion by a solder.

9. A method for manufacturing an optical board comprising:
   a first step of forming a first metal layer on a first main plane of a substrate comprising a plate-shaped resin as well as forming a metal layer on a second main plane;
   a second step of partially removing the first metal layer to expose a strip-shaped portion; and
   a third step of irradiating laser beam obliquely to the exposed strip-shaped portion, to form an optical fiber receiving portion that penetrates completely through the substrate in a thickness direction, and an inclined plane at an end of the optical fiber receiving portion.

10. The method for manufacturing an optical board according to claim 9, further comprising:
    a fourth step of forming a second metal layer on the inclined plane and the first metal layer of the first main plane;
    a fifth step of partially etching the first metal layer and the second metal layer to form a wiring pattern on the first main plane, and
    a sixth step of electrically connecting the wiring pattern to the metal layer on the second main plane.

11. The method for manufacturing an optical board according to claim 9, wherein a region to be irradiated by the laser beam in the third step is distant from an end face of the first metal layer facing the exposed strip-shaped portion for a predetermined distance along a longitudinal direction of the exposed strip-shaped portion.

12. The method for manufacturing an optical board according to claim 11, wherein the predetermined distance is set to be such a dimension that a level difference between a surface of the first metal layer and the first main plane of the substrate at an end face does not affect a flatness of a surface of the second metal layer which corresponds to the inclined plane.

13. The method for manufacturing an optical board according to claim 9, wherein the third step comprises irradiating a laser beam obliquely to the first main plane at an angle corresponding to a tilt angle of the inclined plane to the first main plane.

14. The method for manufacturing an optical board according to claim 9, wherein the third step comprises irradiating a laser beam perpendicularly to the first main plane with the use of a shadow mask with a controlled laser beam transmittance.

15. The method for manufacturing an optical board according to claim 9, wherein the inclined plane is formed by machining.

16. An optical module structure, comprising:
    an optical board comprising: a substrate including a plate-shaped resin including a first main plane and a second main plane facing each other, and a slit-shaped optical fiber receiving portion which penetrates completely between the first main plane and the second main plane in a thickness direction; a metal layer provided on the second main plane; and
    a wiring pattern consisting of metal and provided on the first main plane; and a photoelectric conversion device for converting an optical signal to be transmitted through an optical fiber into an electric signal or an electric signal into the optical signal,
    wherein an inclined plane is provided at an end of the optical fiber receiving portion in the substrate, a tilt angle of the inclined plane with respect to the first main plane is an obtuse angle, and a reflective layer is provided on the inclined plane for reflecting a light output from an optical fiber received in the optical fiber receiving portion toward the first main plane, wherein the photoelectric conversion device is mounted on the first main plane, to cover the inclined plane, and
    wherein an optical fiber is sandwiched between two planes penetrating completely through the substrate.

17. The optical board according to claim 1, wherein the metal layer on the second main plane forms the bottom of the optical fiber receiving portion.

18. The optical board according to claim 9, wherein the metal layer on the second main plane forms the bottom of the optical fiber receiving portion.

19. The optical board according to claim 9, wherein an optical fiber is sandwiched between two planes penetrating completely through the substrate.

* * * * *